US008176147B2

(12) United States Patent
Xu (10) Patent No.: US 8,176,147 B2
(45) Date of Patent: May 8, 2012

(54) METHOD AND MESSAGING SYSTEM FOR MANAGING MEDIA CONTENTS IN UNIFORM STORAGE

(75) Inventor: Guojun Xu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 319 days.

(21) Appl. No.: 12/609,694

(22) Filed: Oct. 30, 2009

(65) Prior Publication Data

US 2010/0049817 A1   Feb. 25, 2010

Related U.S. Application Data

(63) Continuation of application No. PCT/CN2007/071322, filed on Dec. 26, 2007.

(30) Foreign Application Priority Data

Apr. 30, 2007   (CN) .......................... 2007 1 0107164

(51) Int. Cl.
*G06F 15/16*   (2006.01)

(52) U.S. Cl. ....................................... 709/219; 709/206

(58) Field of Classification Search .......... 709/206–207, 709/217–219
See application file for complete search history.

(56) References Cited

U.S. PATENT DOCUMENTS

| 5,920,700 | A * | 7/1999 | Gordon et al. ................. 709/226 |
| 2004/0092272 | A1 | 5/2004 | Valloppillil |
| 2004/0137921 | A1 | 7/2004 | Valloppillil et al. |
| 2005/0198238 | A1 * | 9/2005 | Sim et al. ...................... 709/222 |
| 2006/0072721 | A1 | 4/2006 | Wisniewski |
| 2008/0215683 | A1 * | 9/2008 | Swaminathan et al. ...... 709/205 |
| 2011/0087645 | A1 * | 4/2011 | Seitz et al. .................... 707/707 |
| 2011/0087696 | A1 * | 4/2011 | Lacapra ........................ 707/769 |

FOREIGN PATENT DOCUMENTS

| CN | 1725785 A | 1/2006 |
| CN | 1801785 A | 12/2006 |
| EP | 1447999 A2 | 8/2004 |
| WO | WO 2006/034384 A1 | 3/2006 |

* cited by examiner

*Primary Examiner* — Patrice Winder
*Assistant Examiner* — Ebrahim Golabbakhsh
(74) *Attorney, Agent, or Firm* — Leydig, Voit & Mayer, Ltd.

(57) ABSTRACT

A method for managing media contents in a uniform storage includes: storing media contents and media content metadata corresponding to the media contents at a messaging system network side, performing management operations on the media contents by a user client based on the media content metadata. A messaging system for managing media contents in a uniform storage includes a user client and a network uniform storage entity, wherein the user client is configured to send a request for managing media contents to the network uniform storage entity; the network uniform storage entity is configured to store the media contents and media content metadata, and perform operations corresponding to the management request from the user client based on the media content metadata. Therefore, the user client may perform various management operations on the media contents stored at the messaging system network side. Accordingly, the user experience is improved.

16 Claims, 7 Drawing Sheets

METHOD AND MESSAGING SYSTEM FOR MANAGING MEDIA CONTENTS IN UNIFORM STORAGE

CROSS-REFERENCE TO RELATED APPLICATIONS

This application is a continuation of International Application No. PCT/CN2007/071322, filed on Dec. 26, 2007, designating the United States, which claims the benefit of Chinese Patent Application No. 200710107164.4, filed on Apr. 30, 2007, both of which are hereby incorporated by reference in their entireties.

FIELD OF THE INVENTION

The present invention relates to messaging service over a mobile communication network or Internet, and more particularly, to a method and messaging system for managing media contents in a uniform storage.

BACKGROUND OF THE INVENTION

Messaging service relates to a mobile data service in terms of messages such as person to person, or person to group online messages. A messaging communication system, besides being capable of basic information interaction, should provide users with enhanced service experiences. For example, during a messaging service being used by a user, messages sent or received by the user may be stored uniformly as history messages. Moreover, media contents sent or received by the user during the usage of the messaging service may be stored respectively. Thereafter, the user is allowed to optionally manage the messages and the media contents stored in a uniform storage. Or, the user is allowed to upload media contents that are valuable for himself into a storage at network side.

Instant Messaging (IM) service supports a conversation history service function and an offline message storage function, and provides network storage for messages transceived among multiparty users participating in a conversation. Each user subscribing to the messaging service may have a network backup corresponding to a conversation history record of himself, wherein the network backup includes conversation history messages and conversation history metadata. The conversation history messages record all messages transceived during the conversation among multiparty users participating in the conversation, and serve as a main carrier for conversation history information, to allow the users to retrieve interested contents therein after the conversation. The conversation history metadata exists as history function management information, and is a structural content defined by a messaging service provider, which may be deemed as an abstract of conversation history records.

Converged IP Messaging (CPM) service supports a uniform storage function. The uniform storage for the service may include the following aspects: conversation history messages are stored for a user according to a configuration set by the user or an operator, so that each user subscribing to the messaging service may have a network backup corresponding to his conversation history record; the user may retrieve interested contents by searching with some keywords when the user is interested in the messages or the media contents therein; the user may also store his interested media contents separately. The media contents may come from messages, or may be updated to a uniform storage device by the user himself.

Figure 1:
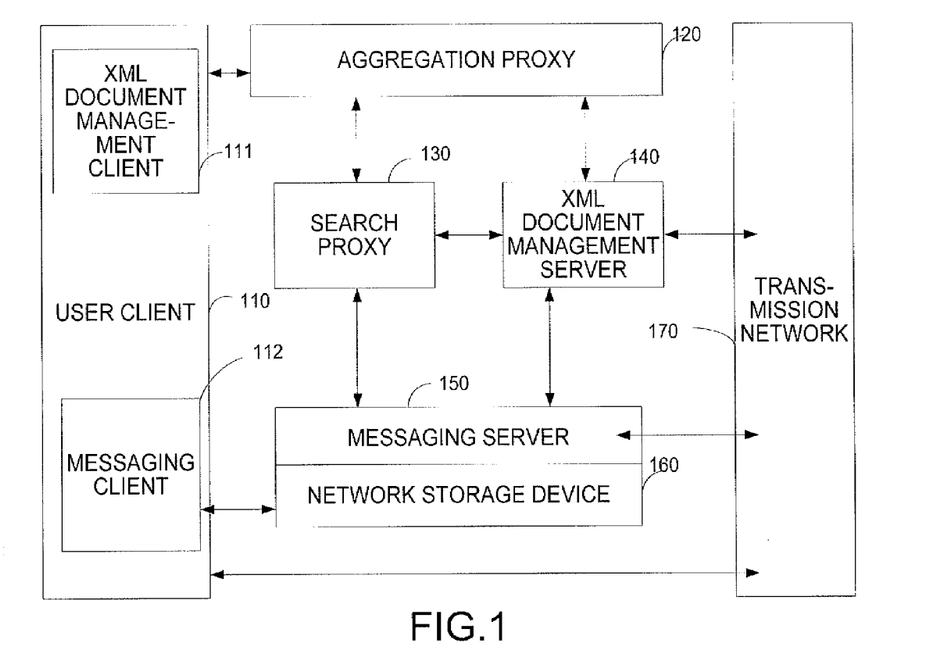
FIG. 1 is an architecture for realizing uniform storage function in a messaging system.

Related standards for specifying the uniform storage function in the messaging service are developed by the Open Mobile Alliance (OMA) standards organization. As shown in FIG. 1, according to the current standard specifications, uniform storage function components are distributed in a Messaging Server (MS) 150 and an Extensible Markup Language (XML) Document Management Server (XDMS) 140, and provide User Agent (UA) 110 of the messaging service with the uniform storage service function via an Aggregation Proxy (AP) and a Search Proxy (SP).

Figure 2:
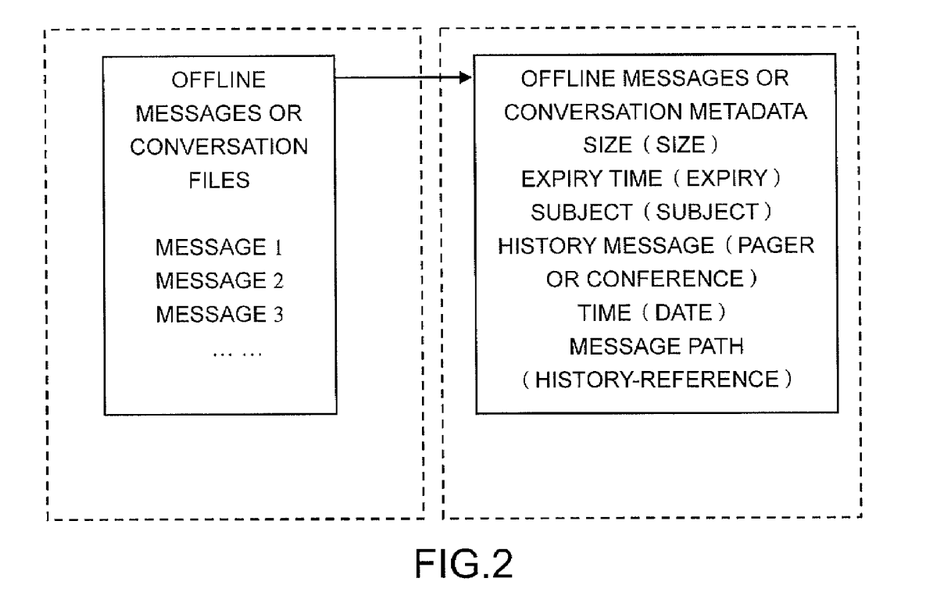
FIG. 2 is a block diagram of uniformly storing conversation messages or offline messages among the users as offline messages or conversation metadata according to the conventional art.

FIG. 2 is a block diagram for uniformly storing conversation messages or offline messages among the users as offline messages or conversation metadata according to the messaging system illustrated in FIG. 1. The conversation metadata includes conversation history lists. Each conversation history list includes size, expiry time, subject, history message (pager or conference), conversation starting time (date), and storage path (history reference).

According to the current technical solutions of conversation history and offline message, capacity of storing history messages and offline messages during the conversation is provided therein, which may satisfy a basic requirement for storing conversation history records for users, or storing other history messages using the method for storing offline messages. However, this solution merely stores general metadata, such as a starting and expiry time of the conversation, a subject of the conversation, etc., or stores related information of the offline messages; whereas, metadata for specific conversation messages or metadata for related media contents during the conversation is not included, such as media data, size, type, etc., and the metadata for related media contents in the messages is not included in the offline messages. Therefore, the current technical solution of uniform storage limits users from the capability of searching media contents or managing media contents in the history messages in the future. As a result, the user may not voluntarily obtain interested messages or media contents directly from the uniform storage device. The basic reason lies in that the network storage for the conversation history and offline messages is devoid of necessary metadata information of the media contents according to the current uniform storage solution.

In summary, although the current messaging solution provides the capacity for storing history messages, inventors find out that there lies at least following problems in the conventional art. The processing for the stored message metadata is not detailed enough to provide information of the media contents in the messages such as storage location, size, subject, etc. Thus, the current solution can not satisfy the need of users to separately store or upload the media contents into a uniform storage entity, and can hardly further satisfy the need of users to manage the media contents in the history messages on such basis.

BRIEF SUMMARY OF THE INVENTION

In view of this, a method for managing media contents in a uniform storage is provided according to an embodiment of the present invention, which may realize the management for the media contents in the uniform storage. The method includes: storing media contents and media content metadata corresponding to the media contents at a messaging system network side, and performing management operations on the media contents by a user client based on the media content metadata.

A messaging system for managing media contents in a uniform storage is further provided according to one embodiment of the present invention. The messaging system comprises a user client and a network uniform storage entity, wherein the user client is configured to send a request for managing media contents to the network uniform storage entity; and the network uniform storage entity is configured to store the media contents and media content metadata, and perform operations corresponding to the management request from the user client based on the media content metadata.

As can be seen from the foregoing technical solutions, the present invention adds media content metadata information in terms of the network uniform storage. According to the media content metadata, users may search history message records further and delete media contents, and may also upload or separately store media contents from messages, and manage the media contents. In this way, messaging service experiences for subscribers in the messaging system are enriched.

DETAILED DESCRIPTION OF THE INVENTION

First, several concepts are to be specified prior to the detailed description of solutions according to the present invention. Pager/Conference History messages record processing information transmitted and received by users and may be in the form of ordinary text messages or in the form of multimedia messages containing pictures, audios or videos. Media Contents generally refer to the parts included in messages other than the ordinary text part, which include pictures, audios or video parts, or generated audio or video files, or media files uploaded by users. History message metadata (Conference/Chat History Metadata) is user specific structural information for managing history messages. The user specific indicates that each user in the service of the conversation history function has a metadata related to himself. Most of these metadata have a uniform hierarchical structure so as to maintain various useful information on which the conversation history management depends. The management includes various operations such as storing, searching, updating, deleting, etc.

Usually, the current messaging system includes the history message metadata specified in the history message management, or the parts in the conversation history metadata hierarchical structure which include neither the media contents parts nor the metadata information of separate media contents. The current metadata structure records message information such as sender, receptor, time, etc. As a result, the user history massage management function is authorized by the current messaging system to merely perform in terms of each message or conversation history content itself, while the user history massage management function can neither further search or maintain the media contents such as interested pictures, audios, or videos thereof, etc., nor store or process the media contents separately.

To resolve the foregoing limitation of conference history management function existing in the messaging system and to improve the history messaging service experience for users, the present invention extends the structural definition for the history message metadata and the conversation history metadata, adds media content metadata related contents into the history message metadata and the conversation history metadata, and supports operations for managing the media contents. The extension includes three aspects as follows.

1. Any data storage format capable of reflecting the metadata hierarchical structure, for example, an XML document that complies with syntax rule of XML Schema, is utilized to provide the history message metadata and the media content metadata in the messaging system with a network storage.

2. Any proper communication protocol, for example, an XML Configuration Access Protocol (XCAP) defined by the Internet Engineering Task Force (IETF), is utilized to access and operate the media content metadata in the network storage of the messaging system or the media content metadata in the history messages.

3. With the foregoing storage formats and the communication protocols, various processing operations for the media contents in terms of the media content metadata or the conference history metadata and the conversation history metadata are performed, including storing, searching (e.g., Xqurey), deleting, permission setting, etc.

Figure 3:
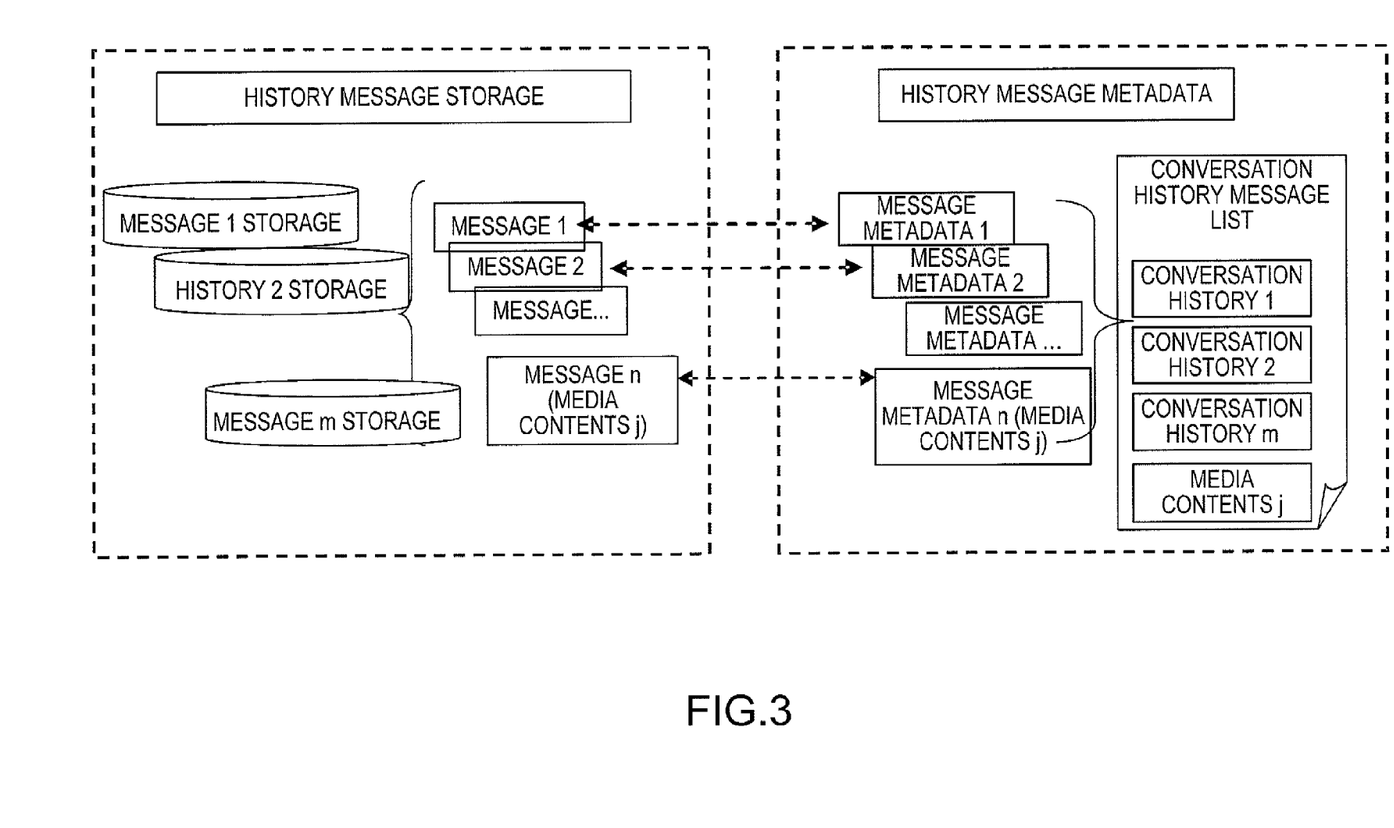
FIG. 3 is a block diagram of a storage structure of conference history metadata according to an embodiment of the present invention.

FIG. 3 is a block diagram of a storage structure of history message metadata according to an embodiment of the present invention. In the XML structuralized definition for the metadata, message metadata may be stored separately, or may be stored together in the same XML document as a sub-element of the metadata in a conversation history metadata list. The media content metadata exists as a sub-element of the message or the conversation history message.

An example illustrating the XML Schema syntax structural definition in terms of the XML document for the history message metadata is shown as follows.

```
<xs:schema attributeFormDefault="unqualified" elementFormDefault="qualified"
    targetNamespace="urn:oma:xml:history-list"
    xmlns="urn:oma:xml:history-list"
    xmlns:xsi="http://www.w3.org/2001/XMLSchema-instance"
    xmlns:xs="http://www.w3.org/2001/XMLSchema"
    xmlns:ns2="http://www.w3.org/1999/xhtml"
    xmlns:ns="urn:oma:xml:history-list">
```

-continued

```
xmlns:hfp="http://www.w3.org/2001/XMLSchema-hasFacetAndProperty">
   <xs:element name="history-list">
      <xs:complexType>
         <xs:sequence maxOccurs="unbounded" minOccurs="0">
            <xs:element name="history" type="historyType"/>
         </xs:sequence>
         <xs:anyAttribute namespace="##other" processContents="lax"/>
      </xs:complexType>
   </xs:element>
   <xs:complexType name="historyType">
      <xs:sequence>
         <xs:element name="size" type="xs:positiveInteger"/>
         <xs:element name="expiry" type="xs:dateTime" minOccurs="0"/>
         <xs:element name="subject" type="xs:string" minOccurs="0"/>
         <xs:choice>
            <xs:element name="pager" type="pagerModeType"/>
            <xs:element name="conference" type="conferenceModeType"/>
            <xs:element name="media" type="MediaType"/>
         </xs:choice>
         <xs:any namespace="##other" processContents="lax" minOccurs="0" maxOccurs="unbounded"/>
      </xs:sequence>
      <xs:attribute name="date" type="xs:date" use="required"/>
      <xs:attribute name="history-reference" type="xs:anyURI" use="required"/>
      <xs:anyAttribute namespace="##other" processContents="lax"/>
   </xs:complexType>
   <xs:complexType name="pagerModeType">
      <xs:sequence>
         <xs:element name="time-stamp" type="xs:dateTime"/>
         <xs:element name="from" type="xs:string"/>
         <xs:element name="to" type="xs:string"/>
         <xs:element name="auth-id" type="xs:string" minOccurs="0"/>
         <xs:element name="pm-list" type="confListType" minOccurs="0"/>
<xs:element name="media" type="mediaType" minOccurs="0"/>
         <xs:any namespace="##other" processContents="lax" minOccurs="0" maxOccurs="unbounded"/>
      </xs:sequence>
   </xs:complexType>
   <xs:complexType name="conferenceModeType">
      <xs:sequence>
         <xs:element name="time-start" type="xs:dateTime"/>
         <xs:element name="time-end" type="xs:dateTime"/>
         <xs:element name="recording-name" type="xs:string" minOccurs="0"/>
         <xs:element name="conf-list" type="confListType" minOccurs="0"/>
</xs:complexType>
<xs:complexType name="msgType">
<xs:sequence>
         <xs:element name="title" type="subjectType" minOccurs="0"/>
         <xs:element name="sender" type="contactType " minOccurs="0"/>
         <xs:element name="receiver" type="contactType " minOccurs="0"/>
<xs:element name="size" type="xs:decimal" minOccurs="1"/>
<xs:element name="sequence" type="xs:int" minOccurs="1"/>
<xs:any namespace="##other" processContents="lax" minOccurs="0" maxOccurs="unbounded"/>
   </xs:sequence>
<xs:attribute name="id" type=" xs:anyURI " use="required"/>
<xs:element name="media" type="mediaType"/>
<xs:attribute name="time" type="xs:dateTime" use="required"/>
<xs:anyAttribute namespace="##any" processContents="lax"/>
</xs:complexType>
         <xs:anynamespace="##other" processContents="lax" minOccurs="0" maxOccurs="unbounded"/>
      </xs:sequence>
</xs:complexType>
<xs:complexType name="mediaType">
   <xs:sequence maxOccurs="unbounded">
      <xs:sequence>
       <xs:element name="title" type="subjectType" minOccurs="0"/>
<xs:element name="msg id " type="xs:anyURI " minOccurs="0"/>
      <xs:element name="size" type="xs:decimal" minOccurs="0"/>
<xs:element name="sequence" type="xs:int" minOccurs="1"/>
<xs:any namespace="##other" processContents="lax" minOccurs="0" maxOccurs="unbounded"/>
   </xs:sequence>
<xs:attribute name="id" type=" xs:anyURI " use="required"/>
<xs:attribute name="time" type="xs:dateTime" use="required"/>
<xs:attribute name="type" use="required">
<xs:choice>
    <xs:element name="file-transfer" type="mType"/>
    <xs:element name="audio" type="duplex"/>
```

-continued

```
      <xs:element name="video" type="duplex"/>
      <xs:element name="image" type="image"/>
      <xs:any namespace="##other" processContents="lax"/>
    </xs:choice>
  </xs:attribute>
  </xs:sequence>
  <xs:anyAttribute namespace="##other" processContents="lax"/>
</xs:complexType>
<xs:complexType name="confListType">
  <xs:sequence maxOccurs="unbounded" minOccurs="0">
    <xs:element name="entry" type="entryType"/>
  </xs:sequence>
</xs:complexType>
<xs:complexType name="entryType">
  <xs:sequence>
    <xs:element minOccurs="0" name="display-name"
            type="xs:string"/>
  </xs:sequence>
  <xs:attribute name="uri" type="xs:anyURI" use="required"/>
</xs:complexType>
</xs:schema>
```

EXAMPLE 1

As can be seen from Example 1, the XML element hierarchy structure of the history message metadata may be expressed as follows.

Root element is the history message list (history-list).

Message metadata element is the conversation history which represents a message record or a conversation record of the user, including sub-elements such as subject, expiry, size, etc., and attributes such as date of the message or the conversation, storage path (history-reference) for the message or the conversation document, etc. The present embodiment adds media information into the XML Schema definition for each message element, adds message (msg) metadata and media information metadata which belong to the conversation into the XLM Schema definition for the conversation metadata. And also, metadata information is added when the media is stored separately.

The element for the conversation history message metadata is the message (msg) which represents messages transceived during the conversation and has its identifier (id) attribute for locating the message in the conversation storage.

Media content metadata includes media contents stored separately, or media contents contained in the message, or media contents transceived during the present conversation. The media content metadata describes information of the media such as size, type, setup time, etc., and may also include the identifier of the message to which it belongs when the media is stored separately. The "id" attribute of the media content metadata is configured to locate the media contents separately, or locate the media contents in the message or the conversation storage.

XML element type for the conversation history metadata is defined as follows.

According to the present embodiment, the media content metadata in the history message may be configured to describe information details including the following elements: such as a message subject, an expiry time, a message sender (from), a message receiver (to), a message size, a media identifier (media ID) in the message, a unique massage identifier (id), and a message sending time.

Or, the media content metadata is configured to describe the message metadata and the media contents of history message details in the conference conversation, including the following elements: a message subject, a message sender and a message receiver, a message sequence number, a message size, a message identifier (id) in the conversation history, a message sending time, and a media identifier (media ID) contained in the message.

Or, it is a separate media content metadata which includes the following elements: a media content subject, an expiry time, a media size, a media sender, a media identifier (media ID), and a sending time.

By adding the foregoing media content metadata information in terms of the media contents into media records or message history records in the messaging system, the system not only allows users to browse the stored description information of the media contents, but also provides users with the means for managing the media contents.

According to different configurations for network devices provided by messaging service operators, the media contents, the history messages, the media content metadata, and the message history metadata may be stored flexibly between a messaging service server and a background data storage device (such as an XML document management server, etc.).

The media contents, the history messages, the media content metadata, and the message history metadata are all stored in the messaging service server.

The media contents, the history messages, the media content metadata, and the message history metadata are all stored in the data storage device.

The media contents and the history messages are stored in the messaging service server, while the media content metadata and the message history metadata are stored in the data storage device.

The media contents and the history messages are stored in the data storage device, while the media content metadata and the message history metadata are stored in the messaging service server.

Although the media contents and the history messages may have different storage locations, the messaging system should have a physical location independent of the media contents and the conversation history information, so as to provide messaging user clients with a uniform accessing interface of the media content and history message function and to support coherent user experiences of the messaging service. In the following description, network storage entities for storing the media contents, the history information, and/or the media content metadata, and the history message metadata are collectively called a network uniform storage entity.

Besides providing a search proxy with function for searching the media contents and the history messages, the network uniform storage entity needs to further include:

an uploading module, configured to receive and store media contents uploaded by a user client, and generate media content metadata corresponding to the media contents;

a deleting module, configured to delete corresponding media contents, history messages containing the media contents, or other history messages belonging to the same conversation as the history messages containing the media contents based on a deletion request from the user client.

The following description shows an exemplary document of the history metadata, and also illustrates how various management operations are performed on the media contents of the history messages in terms of the exemplary document according to the embodiment of the present invention.

Embodiment 1

A Search for Media Contents Contained in the History Messages and Other Management Functions The exemplary document illustrating the XML format of the history message metadata is as follows.

```
HTTP/1.1 200 OK
Etag: "etu15"
...
Content-Type: application/vnd.oma.history+xml
<?xml version="1.0" encoding="UTF-8"?>
<history-list xmlns="urn:oma:xml:history-list">
  <history date="2006-08-13" history-reference=" complete path/name
    of history ">
      <size>3000</size>
      <expiry>2006-08-15T19:13:00.0Z</expiry>
        <subject>Soccer</subject>
  <pager>
        <time-stamp>2006-08-13T19:13:00.0Z</time-stamp>
          <from>sip:merlin@example.com</from>
          <to>sip:Bob@example.com</to>
            <media id = "dc4kswow"      time =
               "200608132038"    type = "image">
    <title >goal</ title >
            <sequence>1</ sequence >
            <size>200</size>
          </media>
        <auth-id>sip:medlin@example.com</auth-id>
  </pager>
    </history>
  <history date="2006-08-13" history-reference=" complete path/
  name of history ">
      <expiry>2006-08-19T19:13:00.0Z</expiry>
        <media id = "dc4kswow" time = "200608132038" type = "image">
          <title >goal</ title >
            <sequence>1</ sequence >
            <size>300</size>
          </media>
        <auth-id>sip:medlin@example.com</auth-id>
    </history>
  <history date="2006-08-14"
  history-reference="sip:friends@example.com">
    <size>25</size>
    <expiry>2006-08-16T15:05:00.0Z</expiry>
    <subject>"friends"</subject>
    <conference>
      <time-start>2006-08-14T15:05:00.0Z </time-start>
      <time-end>2006-08-14T15:15:00.0Z </time-end>
      <recording-name>friends</recording-name>
      <msg id = "d93kswow" time = "200608141508">
  <title >Holiday </ title >
  <sender>
      <name> Alice </name>
      <uri>alice@example.com</uri>
    </sender>
    <reciever>
      <name> Bob </name>
      <uri>bob@ example.com</uri>
    </reciever>
      <sequence>5</sequence>
      <size>10</size>
        <media id = "d93kswow04"      time =
          "200607111038"    type = "image">
  <title >Holiday Picture</ title >
  <size>5</size>
  <sequence>1</sequence>
  </media>
    </msg>
      <conf-list>
          <entry uri="sip:Bob@example.com">
            <display-name>Boby</display-name>
          </entry>
          <entry uri="sip:medlin@example.com"/>
        </conf-list>
      </conference>
    </history>
</history-list>
```

EXAMPLE 2

Figure 4:
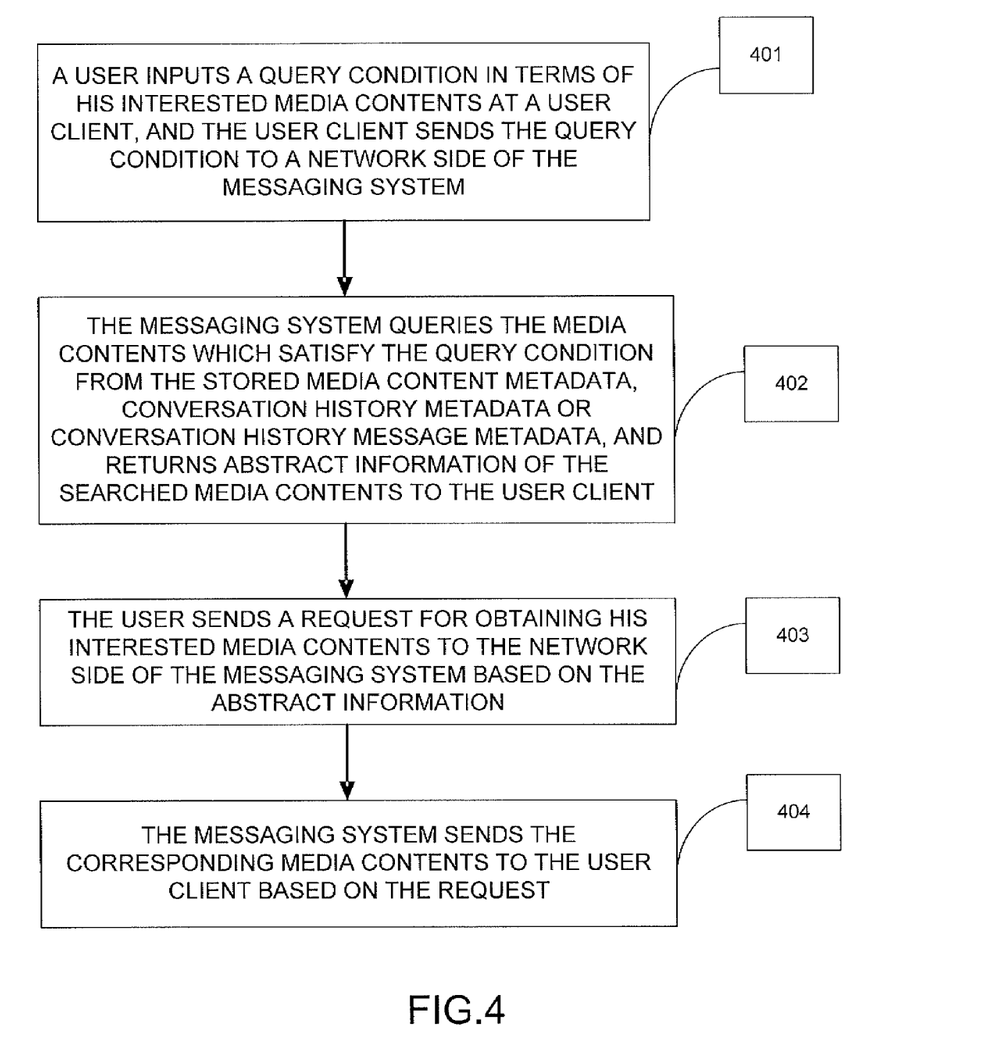
FIG. 4 is a processing flowchart of searching media contents according to an embodiment of the present invention.

The processing procedure for searching the media contents in terms of the document in Example 2 is shown in FIG. 4, which includes steps below.

Step 401: A user inputs a query condition in terms of his interested media contents at a user client, and the user client sends the query condition to a network side of the messaging system. The query condition may be any element of the history message metadata or the media content metadata, or any combination thereof. For example, the query condition may be sender, sending time, media identifier or message identifier, etc., or a combination of the above elements. Moreover, the query condition may be either specific or vague, for example, a query for the media contents with the size larger than 1M, or a query for the media contents with the sending time on Aug. 13, 2006, etc.

Step 402: The messaging system queries the media contents which satisfy the query condition from the stored media content metadata, conversation history metadata or conversation history message metadata, and returns abstract information of the searched media contents to the user client. The abstract information includes part or all of elements in the media content metadata, and may further include the media content metadata identifier.

Step 403: The user sends a request for obtaining his interested media contents to the network side of the messaging system based on the abstract information.

Step 404: The messaging system sends the corresponding media contents to the user client based on the request.

At step 403, the user may also send a request for obtaining corresponding message contents to the network side of the messaging system based on a message identifier contained in the abstract information of the message contents. Thus, at step 404, the messaging system sends the stored corresponding history message contents to the user client based on the request.

Figure 5:
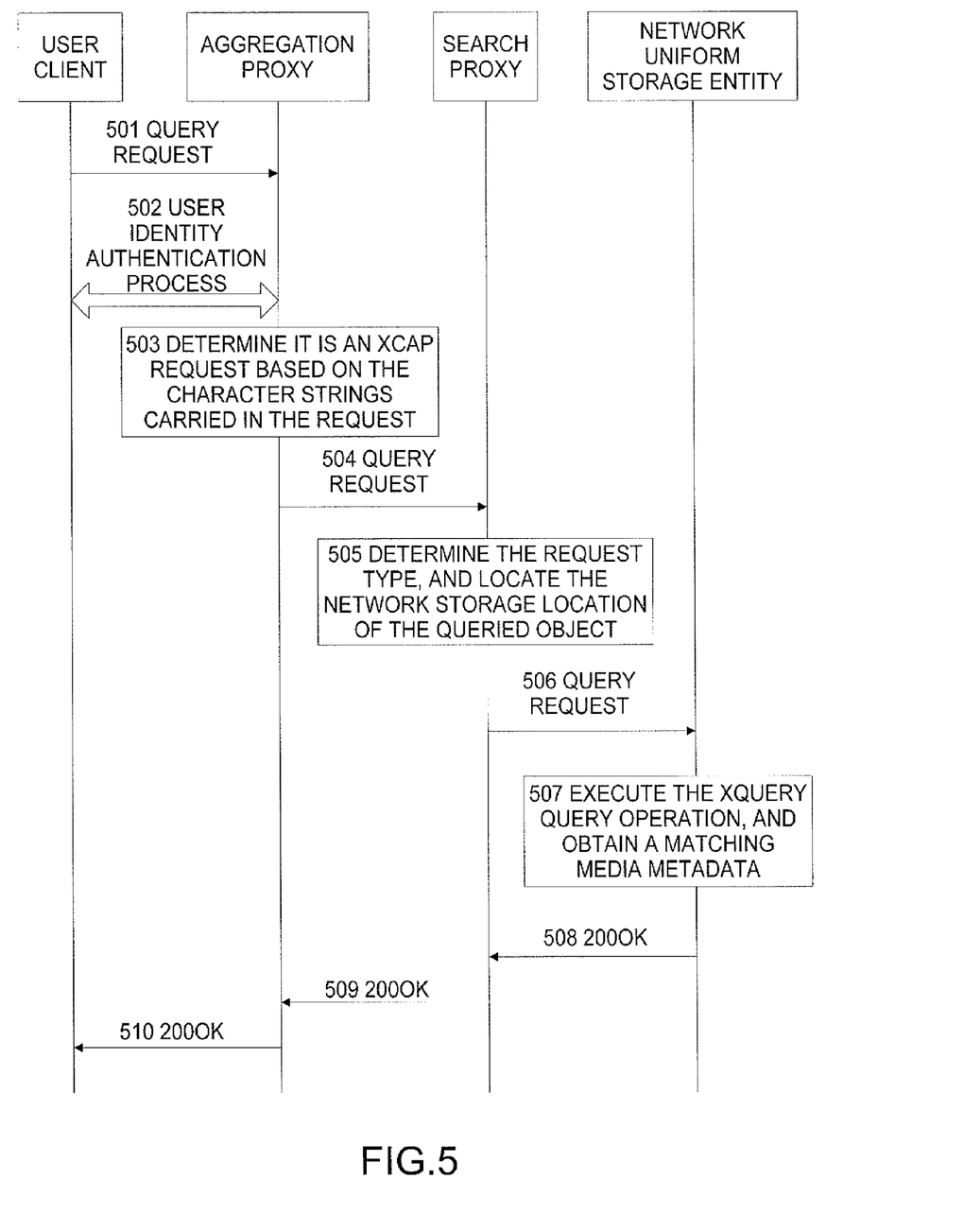
FIG. 5 is a flowchart of signaling interaction and processing procedure for obtaining conference conversation history metadata by a user according to an embodiment of the present invention.

FIG. 5 shows the signaling interaction and processing procedure for obtaining history metadata in a conference conversation by a user. In FIG. 5, a user client represents the user client who intends to search a conference conversation history. An aggregation proxy is a proxy entity for providing the user with an access to the messaging system storage. A search proxy is a proxy entity in the messaging system responsible for a search for the conversation history metadata. The procedure includes steps as follows.

Step 501: The user client sends an XCAP POST request containing an XQuery query statement to the aggregation proxy. In the present embodiment, a messaging user Bob intends to search all history messages sent from Alice in a conversation with a subject of "Weekend Meet". The query request is detailed as follows.

```
POST HTTP://xcap.example.com/org.openmobilealliance.search
HTTP/1.1
... ...
X-3GPP-Intended-Identity: " sip:bob@example.com "
Content-Type: application/conv-hist+xml
Content-Length: {...}
...
<?xml version="1.0" encoding="UTF-8"?>
<search id="1234"
    xmlns="urn:oma:params:xml:ns:search"
    xmlns:xsi="http://www.w3.org/2001/XMLSchema-instance">
    <request>
    <![CDATA[
        for $x in doc("org.openmobilealliance/global/conversation")/
        history-list
            where $x/subject="Weekend Meet"
                if($x/msg/meida type="image" or $x/media/
                meida type="image")
    return    <history-list = "{data($x/@db-ref)}">
            <media       id       =       "{data($x/
msg/@id)}" >{$x/msg/title }</msg></conv>
    </request>
    </search>
```

EXAMPLE 3

The identifier information of the user client needs to be included in the request, i.e., a Uniform Resource Locator (URL) of the searcher in Example 3 "sip:bob@example.com". Character strings of the OMA organization are included in the URL: "org.openmobilealliance.search", configured to indicate that it is an XCAP query request.

Step 502: The aggregation proxy initiates a process for authenticating user identity to determine whether it is a valid user client. If the user client is authenticated to be valid, subsequent steps will be continued. Otherwise, the present process will be quitted. The present step may be an optional step.

Step 503: The aggregation proxy determines that the request type is an XCAP query request based on the character strings "org.openmobilealliance.search" in the URL of the received POST request.

Step 504: The aggregation proxy forwards the XCAP POST request to the search proxy.

Step 505: The search proxy determines this is a query request in terms of history information based on the Application Unique ID (AUID) "org.openmobilealliance/global/conference history" in the query request. Combined with the user URL "sip:bob@example.com", the search proxy further locates the queried object, i.e., the network storage location of the history message metadata.

Step 506: The search proxy forwards the query request to the network uniform storage entity based on the located network storage location.

Step 507: The XQuery query statement in the received query request is executed by the network uniform storage entity, to thereby obtain a matching media content metadata.

Step 508 to step 510: The network uniform storage entity carries the matching media content metadata in a 200OK response message, and sends the 200OK message to the search proxy. The 200OK message is forwarded by the search proxy and the aggregation proxy, and is finally sent to the user client. The 200OK response message is described below.

```
HTTP/1.1 200 OK
... ...
Content-Type: application/conv-hist-set+xml
Content-Length: {...}
<?xml version="1.0" encoding="UTF-8"?>
<search       id="1234"        xmlns="urn:oma:params:xml:ns:search"
xmlns:xsi="http://www.w3.org/2001/XMLSchema-instance">
    <response>
        < history-list = " storage01@example.com"
        > <media id = "52789Syt845">
Holiday Picture002 </media> <msg id = "12435Ret565"/msg></ conv >
        < history-list = " storage01@example.com"
        > <media id = "52789Syt845">
Holiday Picture002 </media>        </response>
```

EXAMPLE 4

Upon receipt of the query response, the user client will obtain a qualified media reference, i.e., "media id" in the example and other media character information such as subject, size, setup time, etc. Next, on one aspect, the user client presents to the user the media character information which helps the user to select and determine the media query. On anther aspect, the user client may further extract the corresponding media character information based on the user selection in order to generate a media download request list, and to thereby create and send a request for obtaining the media contents.

Figure 6:
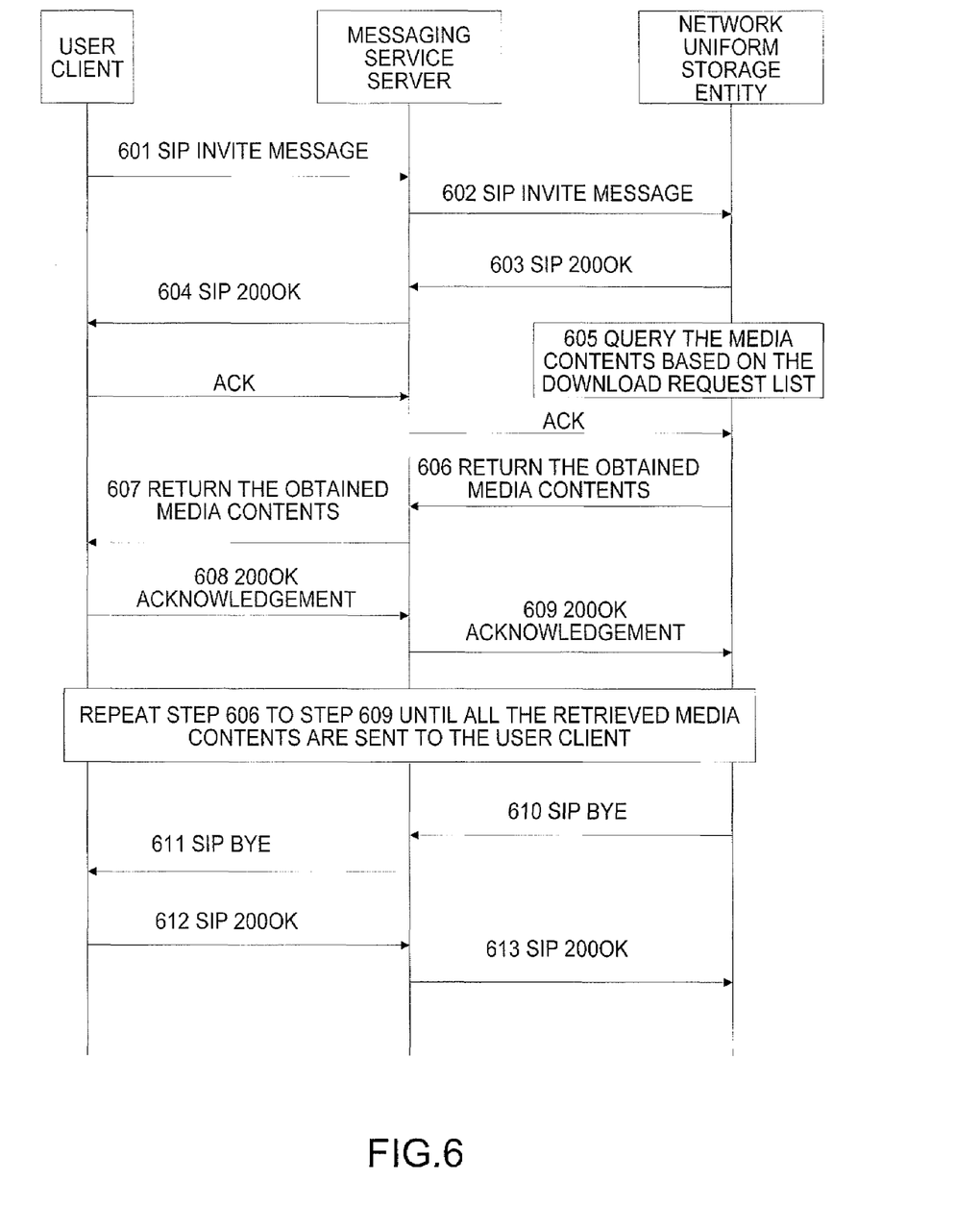
FIG. 6 is a flowchart of obtaining media contents by a user client according to an embodiment of the present invention.

FIG. 6 is the procedure for obtaining media contents by a user client according to an embodiment of the present invention, which includes the steps as follows.

Step 601: A user client sends to a messaging service server a Session Initiated Protocol Invite (SIP INVITE) request, wherein the request includes a media download request list containing a media identifier which the user intends to download.

Step 602: The messaging service server forwards the SIP INVITE request to a network uniform storage entity.

Step 603 to step 604: The network uniform storage entity returns an SIP OK message to the messaging service server. Then, the messaging service server forwards the SIP OK message to the user client. After that, the user client sends a response message (ACK) to the messaging service server. Then, the messaging service server forwards the response message to the network uniform storage entity.

Step 605: The network uniform storage entity extracts the media identifier from the download request list in the SIP INVITE request, and retrieves the stored media contents based on the media identifier, to thereby obtain the user needed media contents.

Step 606 to step 607: The network uniform storage entity sends the retrieved media contents to the messaging service server. Then, the messaging service server forwards the media contents to the user client. Generally, assume the media contents are sent over a Message Session Relay Protocol (MSRP) SEND message.

Step 608 to step 609: The user client returns an MSRP 200OK response message to the messaging service server.

Then, the messaging service server forwards the MSRP 200OK response message to the network uniform storage entity.

According to a different quantity of retrieved media contents, the foregoing step 607 to step 609 may be performed only once, or may be performed for several times until all the retrieved media contents are sent to the user client.

Step 601 to step 611: After the transmission for the media contents is completed, the network uniform storage entity sends an SIP BYE message to the messaging service server to disconnect from the user client. Then, the messaging service server forwards the SIP BYE message to the user client.

Step 612 to step 613: The user client returns to the messaging service server an SIP 200OK response. Then, the messaging service server forwards the SIP 200OK response to the network uniform storage entity.

After the media contents are obtained, the user may further intend to know about messages related to the media contents, wherein the messages may include descriptions of the related media contents.

If the user intends to obtain the history message where the media contents are located, the user may click the history message identifier at a display interface of the user client. Thus, the user client sends the SIP INVITE request containing such message identifier to the messaging service server. The process for obtaining the message may be readily appreciated by those skilled in the art by reference to the procedure illustrated in FIG. 6.

If the user intends to obtain a history message prior to or subsequent to the message where the media contents are located, the user client generates a corresponding query request for the conversation history message metadata based on the queried message sequence number and the identifier of its located conversation (db-ref). For example, if a message, prior to the message with sequence number of "N" where media contents are located, is to be queried, thus the conversation history message metadata with sequence number of "N−1" in the conversation is queried. If a message n subsequent to the message where media contents are located is to be queried, thus the conversation history message metadata with sequence number of "N+n" in the conversation is queried. The specific query procedure is available according to the procedure illustrated in FIG. 5. When the query arrives at the beginning or end of the context of the conversation history messages, or exceeds the scope of the present conversation, a reminder should be given to the user client.

The embodiment of the present invention further provides operations for deleting uniformly stored media contents. The deletion for the media contents is divided into two scenarios, i.e., an active deletion requested by a user, and an automatic deletion based on a storage policy.

Figure 7:
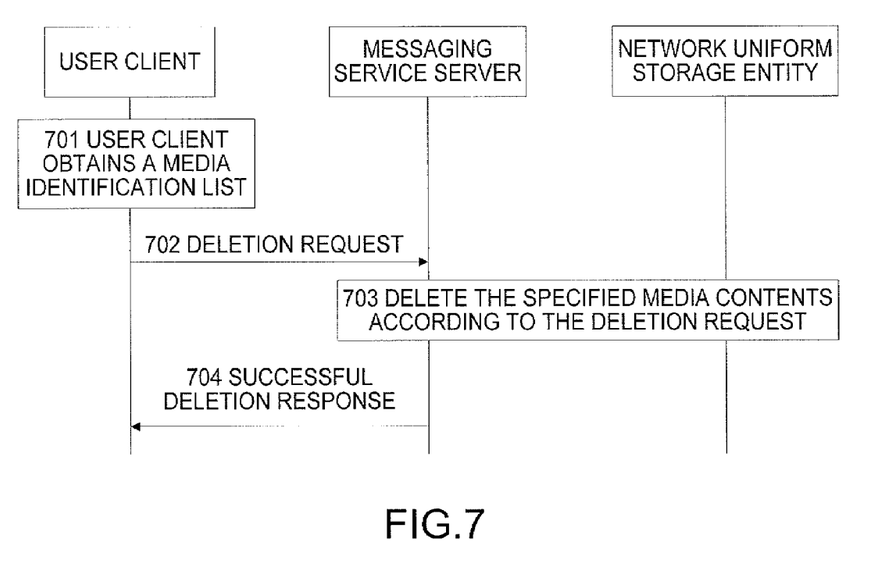
FIG. 7 is a processing flowchart of deleting media contents via a messaging server by a user according to an embodiment of the present invention.

The active deletion requested by a user may be accomplished via a messaging service server or an aggregation proxy. The procedure for deleting the media contents via the messaging server is illustrated in FIG. 7 which includes steps as follows.

Step 701: A user client needs to delete the media contents according to the user request. Therefore, the client needs to obtain information of the media to be deleted, such as media identifier, etc.

Step 702: The client sends a request message for deleting the media to the messaging service server. The message carries a media identifier of the media contents to be deleted.

The request message for deleting the media may use the form of SIP REFER message or other forms to achieve media deletion function.

If it is an SIP REFER message, a brief example of the message is shown as follows.

```
REFER sip:Deletemedia@hostname SIP/2.0      //indicating
that the server is instructed to delete the media
Refer-To: <"media id":method=REFER>         //indicating that the
server is instructed to delete the media, and indicating the name
(including the reference) of the media to be deleted
```

EXAMPLE 5

Step 703: The messaging service server deletes the specified media contents and the corresponding media content metadata information stored in a network uniform storage entity based on the media deletion request.

Step 704: The messaging service server returns to the user client a successful response message of the media deletion, and notifies the client that the media deletion is successful.

Figure 8:
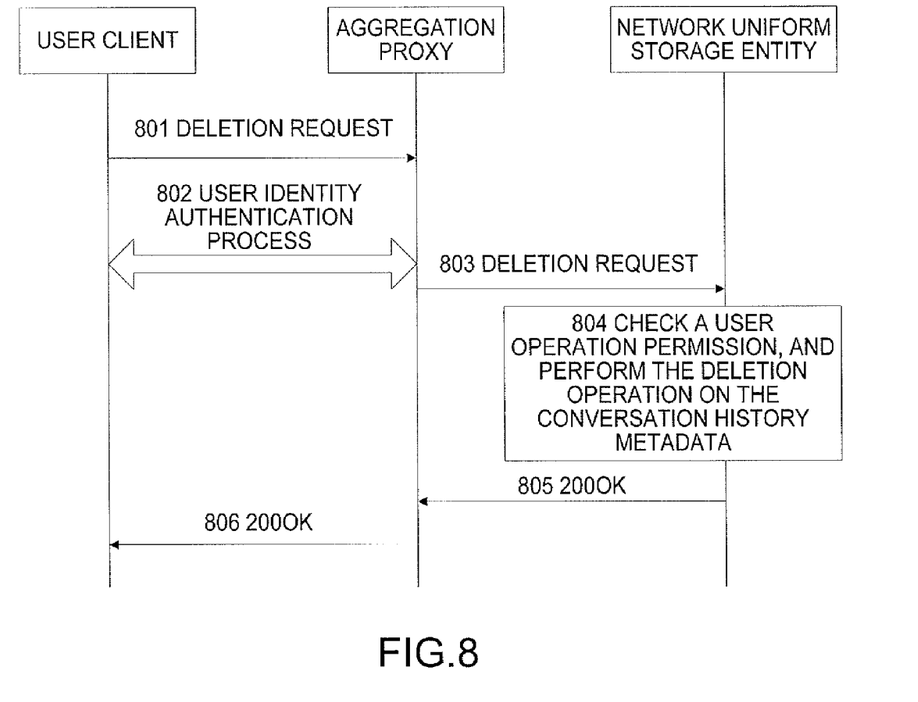
FIG. 8 is a processing flowchart of voluntarily requesting to delete media contents via an aggregation proxy by a user according to an embodiment of the present invention.

FIG. 8 illustrates the processing procedure for actively deleting media contents requested by a user via an aggregation proxy, which includes steps as follows.

Step 801: The user client sends a request for deleting the media to the aggregation proxy, which includes: the access URI of the media content metadata XCAP (xcap.example.com/conv-hist-set), the URI of media owner (sip:bob@example.com), and the identifier of the media content metadata to be deleted.

A specific example is shown below. With respect to the history metadata document in Example 1, the message user Bob requests to delete a conversation with subject of "Weekend Meet" and message subject of "Holiday Picture001". According to the aforementioned user instruction, the user end creates an XCAP deletion request message below.

```
DELETE
HTTP://xcap.example.com/conv-hist-set/users/sip:bob@example.com/
history.xml/~~/conv-hist-set/conv [@db-ref =
" storage01@ exampl.com " ]/msg [@id =
" d93kswow " ]/media [@id = "12345db" HTTP/1.1
Content-Length: 0
```

EXAMPLE 6

As can be seen from the deletion request message shown in Example 6, the user Bob merely requests to delete the corresponding media contents. If the media contents are corresponding to the history messages or the conversation history, it may delete one or more messages in the history messages or the conversation history. However, deleting whole conversation contents is more common. At this point, the deletion request message is similar to Example 6, where the difference lies in that the "HTTP URI" therein includes the identifier of the message to be deleted, or merely includes the identifier of the conversation history metadata to be deleted.

Step 802: An optional procedure for user identity authentication. If the present step is selected, the following steps will be performed when the user is authenticated to be valid. Otherwise, the present procedure will be quitted.

Step 803: According to the access URI of the media content metadata XCAP, the aggregation proxy forwards the deletion request to the network uniform storage entity corresponding to the media contents.

Step 804: The network uniform storage entity checks a user operation permission according to the user URI. If the operation permission is valid, the deletion operation in terms of the corresponding media contents is performed based on the media content metadata identifier (conv [@db-ref]/msg [@id]).

Step 805 to step 806: The network uniform storage entity returns to the aggregation proxy an HTTP 200OK response, and then the aggregation proxy forwards the 200OK response to the user client.

The automatic deletion according to the storage policy is based on an expiry time element contained in the structural definition for media content metadata, and the value of which is to define a storage period for media record. Once a clock of the messaging system exceeds the predetermined value of the expiry time, the corresponding media record is deemed to be expired. At this point, the network storage entity will automatically delete the media contents.

Embodiment 2

The Management for Media Contents Independent of Messages

The media contents independent of messages in the messaging system may be originated from uploading the media contents to the network uniform storage entity according to an active request by user, or from separately storing the media contents of multimedia messages into the network uniform storage entity.

Figure 9:
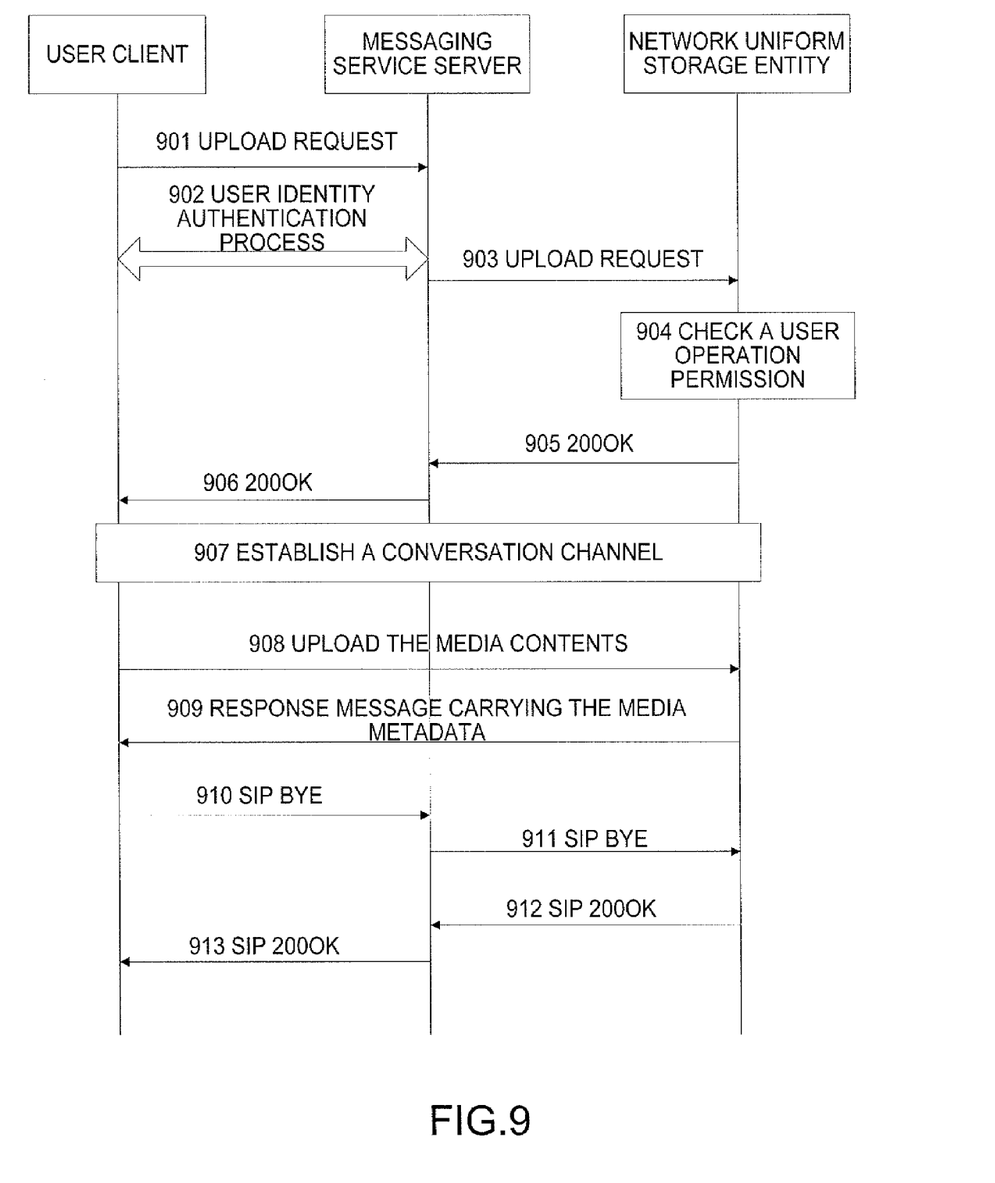
FIG. 9 is a processing flowchart of voluntarily uploading media contents by a user according to a second embodiment of the present invention.

The processing procedure for actively uploading media contents by the user is illustrated in FIG. 9, which includes steps as follows.

Step 901: A user client sends an SIP MESSAGE or an SIP INVITE request to an URI of the messaging service server, requesting to upload media contents.

Step 902: An optional procedure for user identity authentication.

Step 903: The messaging service server sends to the network uniform storage entity the SIP message or the SIP INVITE request of the media contents requiring the upload.

Step 904: The network uniform storage entity check the user operation permission. If the user has the operation permission, proceed to subsequent steps.

Step 905 to step 906: The network uniform storage entity returns to the user client a 200OK message via the messaging service server.

Step 907: A conversation channel is established between the user client and the network uniform storage entity.

Step 908: The network uniform storage entity receives and stores the media contents uploaded from the user client, and then generates and stores the media content metadata corresponding to the media contents.

Step 909: The network uniform storage entity returns to the user client a response message carrying the media content metadata which corresponds to the media contents uploaded from the user client.

The user client may once upload one or more media contents, thus, step 908 to step 909 may be repeated for several times until all the media contents are uploaded.

Step 910 to step 911: After the media contents are uploaded, the user client sends an SIP BYE message to the network uniform storage entity via the messaging service server, requesting to disconnect from the network uniform storage entity.

Step 912 to step 913: The network uniform storage entity returns to the user client a 200OK message via the messaging service server.

Upon receipt of the multimedia message, the user sends to the network uniform storage entity a request for storing the media contents in terms of the interested media contents of the message. Next, the media contents may be stored in the network uniform storage entity according to the similar procedure shown in FIG. 9.

When the stored multimedia message is found by the user via the search proxy, the user may identify the multimedia in terms of his interested media contents, and send the identifier to the server via the SIP message in order to instruct the server to store the multimedia contents in the network storage separately.

According to the solutions of the present invention, metadata information of media contents in history messages, or metadata information of separate media contents is added in terms of the network uniform storage. It is noted from the embodiments of the present invention, users may search history message records further and delete media contents, and may also upload or separately store media contents from messages, and manage the media contents. In this way, messaging service experiences for subscribers in the messaging system are enriched.

The foregoing is merely preferred embodiments of the present disclosure, which not be construed as limitation to the present disclosure. Any modifications, equivalents, improvements, etc., made within the spirit and principle of the present disclosure shall fall within the scope of the present disclosure.

The invention claimed is:

1. A method for managing media contents in a uniform storage, comprising:
   storing the media contents and media content metadata corresponding to the media contents at a messaging system network side;
   receiving, by the messaging system network side, a query condition with the media content metadata from a user client;
   searching the media contents which satisfy the query condition based on the stored media content metadata;
   returning abstract information of the searched media contents to the user client, wherein the abstract information of the searched media contents comprises a message identifier, a message sequence number and a conversation identifier of the media contents;
   generating, by the user client, a sequence number of other history messages belonging to the conversation identifier based on the message identifier, the sequence number and the conversation identifier in the abstract information;
   sending a request for obtaining the other history messages including the generated sequence number of the other history messages, to the messaging system network side; and
   sending, the messaging system network side, the media contents corresponding to the sequence number of the other history messages, to the user client based on the request.

2. The method of claim 1, wherein the media contents metadata stored at the messaging system network side comprise: media content metadata in history message metadata or conversation history metadata, or media content metadata stored separately.

3. The method of claim 1, further comprising:
sending, by the user client, a request for obtaining the media contents to the messaging system network side based on the abstract information; and
sending, by the messaging system network side, the corresponding media contents to the user client based on the request.

4. The method of claim 1, wherein prior to sending the message contents corresponding to the sequence number of other history messages to the user client by the messaging system network side based on the request, the method further comprises:
sending to the user client a reminder message when the messaging system network side determines that the sequence number of other history messages arrives at the beginning or end of a context of the conversation history messages, or exceeds the scope of the conversation history messages.

5. The method of claim 1, wherein further comprising;
performing management operations on the media contents by the user client based on the media content metadata, the management operations comprising:
receiving, by the messaging system network side, a query request from the user client for querying the media content metadata;
locating a network storage location of the queried media content metadata based on the query request; and
forwarding the query request to a corresponding network uniform storage entity;
performing, by the corresponding network uniform storage entity, a query operation corresponding to the received query request;
obtaining matching media content metadata; and
sending to the user client a response message carrying the matching media content metadata.

6. The method of claim 1, further comprising:
deleting the media contents stored at the messaging system network side if a clock of the messaging system network side exceeds an expiry time in the media content metadata.

7. The method of claim 1, further comprising: performing wherein management operations on the media contents by the user client based on the media content metadata, the management operations comprising:
receiving, by the messaging system network side, a media deletion request containing a media content metadata identifier, and
deleting the corresponding media contents based on the media content metadata identifier therein.

8. The method of claim 1, further comprising: performing management operations on the media contents by the user client based on the media content metadata, the management operations comprising:
receiving, by the messaging system network side, an upload request from the user client for uploading media contents, establishing a conversation channel between the user client and a network uniform storage entity;
receiving and storing, by the network uniform storage entity, the media contents uploaded by the user client, generating and storing the media content metadata corresponding to the media contents.

9. The method of claim 8, wherein after generating and storing the media content metadata corresponding to the media contents, the method further comprises:
returning, by the network uniform storage entity, to the user client a response message carrying the media content metadata corresponding to the media contents uploaded by the user client.

10. A messaging system for managing media contents in a uniform storage, comprising:
a user client configured to send a management request for managing the media contents to a network uniform storage entity; and
the network uniform storage entity configured to store the media contents and media content metadata corresponding to the media contents, and perform operations corresponding to the management request from the user client based on the stored media content metadata;
a search proxy, configured to receive a query condition from the user client, locate a queried object based on a query request, send the query request to the network uniform storage entity based on a location, and forward abstract information of the media contents from the network uniform storage entity to the user client; wherein,
the network uniform storage entity is further configured to search the media contents which satisfy the query condition from the search proxy, and return the abstract information of the media contents which satisfy the query condition to the search proxy, wherein the abstract information of the searched media contents further comprises a message identifier, a message sequence number and a conversation identifier of the media contents;
the user client is further configured to generate a sequence number of other history messages belonging to the conversation identifier based on the sequence number and the conversation identifier in the abstract information, and send a request for obtaining the other history messages including the generated sequence number of the other history messages, to the network uniform storage entity; and
the network storage entity is further configured to send the media contents corresponding to the sequence number of the other history messages, to the user client based on the request.

11. The messaging system of claim 10, further comprising:
an aggregation proxy, configured to receive a query request from the user client, determine a type of the query request, and send the query request to the search proxy based on a determination result.

12. The messaging system of claim 11, wherein the aggregation proxy is further configured to receive a deletion or upload request from the user client, determine a type of the deletion or upload request, and send the deletion or upload request to the network uniform storage entity based on the determination result.

13. The messaging system of claim 10, wherein the network uniform storage entity is further configured to store history messages and history message metadata.

14. The messaging system of claim 10, wherein the network uniform storage entity further comprises an uploading module, configured to receive and store media contents uploaded by the user client, and generate a media content metadata corresponding to the media contents.

15. The messaging system of claim 10, wherein the network uniform storage entity further comprises a deleting module, configured to delete one of the corresponding media contents, history messages containing the media contents, and the other history messages belonging to the same conversation as the history messages containing the media contents, based on the deletion request from the user client.

16. The messaging system of claim 10, wherein the network uniform storage entity is distributed in one of a messaging service server and a background data storage device, and provides a uniform interface to the outside.

* * * * *